Patented Sept. 19, 1950

2,522,584

UNITED STATES PATENT OFFICE 2,522,584

RESINOUS REACTION PRODUCTS OF A CONGO COPAL RESIN AND AN ABIETYL AMINE OR AN ABIETYL ISOCYANATE

Alfred E. Rheineck, Wilmington, Del., assignor to Hercules Powder Company, Wilmington, Del., a corporation of Delaware No Drawing. Application December 31, 1948, Serial No. 68,756

13 Claims. (Cl. 260—102)

This invention relates to new synthetic resins derived from fossil resins of the Congo copal class and to methods for their production. More particularly, it relates to synthetic resins prepared from such fossil resins and an abietyl amine or an abietyl isocyanate and to methods for their production.

Congo copal resins have been employed by the protective coating industry due to the fact that they introduce certain advantageous properties; namely, depth of finish, high gloss and scuff resistance, in the coating compositions in which they are employed. They are especially useful in the manufacture of oleo-resinous varnishes and products derived therefrom. These Congo copal resins, however, are virtually useless for this particular application unless they have been first subjected to a partial destructive distillation process known as "running." This process consists in heating a resin of this type at a temperature in the range of 225° C. to 325° C. for such a period of time as is necessary to render the resin soluble in the usual oils and solvents used in varnish making. The running process varies in time, temperature, and duration depending upon the particular use which is to be made of the resin. The process is essentially one of degradation, accompanied by loss of volatile material (hydrocarbons and acids), to the extent of from 20 to 30% of the original weight of the resin treated. These volatile materials can be collected but to date they have been of no practical utility.

It would seem that the Congo copals would also find use in nitrocellulose lacquer coating compositions for the reasons mentioned hereinabove. However, this use has not developed due largely to the fact that the Congo copals, either before or after running, do not evidence true compatibility with nitrocellulose. That the Congo copal resins are in fact incompatible with nitrocellulose can be shown by viewing a film deposited by a nitrocellulose lacquer formulated with a "run" Congo copal as the resin ingredient. The film will be found to be hazy. The presence of haze is clear evidence of incompatibility of the resin and the nitrocellulose.

There are at least two phenomena observable in nitrocellulose lacquer films which evidence incompatability of the resin and the nitrocellulose. One is seediness or graininess which can be observed by viewing in the direction of a source of light a dried film held horizontally at near eye level. The phenomenon is manifested as small specks spread uniformly throughout the film. The other is haziness which may be observed by viewing the film against a dark background and is manifested as a smoky or milky condition. The use of Congo copal resins in nitrocellulose lacquers gives rise to this second type of incompatibility.

For ease of presentation, the term "untreated" when used in conjunction with "Congo copal" will refer to such a resin which has not been subjected to the process of "running," as that term is employed in the art here involved.

Now, in accordance with this invention, it has been found that reaction products of untreated Congo copal resins and either an abietyl amine or an abietyl isocyanate are unique and distinctively different from either the untreated Congo copal resins or the treated resins hereinabove discussed in that they possess true compatibility with nitrocellulose. Nitrocellulose lacquer films containing such reaction products have been found to possess perfect clarity. Such films are entirely free of seediness or graininess on the one hand and are on the other hand entirely free of haziness. At the same time, these derivatives of Congo copal resins contribute to nitrocellulose lacquers the same desirable properties which, as mentioned previously, the Congo copal resins per se contribute to oleoresinous varnishes; i. e., depth of finish, high gloss and scuff resistance.

The reaction products with which this invention is concerned are prepared by heating an untreated Congo copal resin with either an abietyl amine or an abietyl isocyanate at a temperature which promotes amide formation between the acid constituents of the Congo copal resin and the particular amine or isocyanate employed. The heating is continued for a period of time long enough to provide a resin having an acid number of 25 or less and possessing nitrocellulose compatibility. It will be realized, of course, that the Congo copal resins are acid in character in their untreated form. (It is reported by Mantell et al. in Technology of Natural Resins (1942), page 22, that Congo copal resins have an average direct acid number of 100). Hence, it will be understood that in preparing the subject reaction products sufficient of the abietyl amine or isocyanate must be employed to achieve the requisite reduction in acid number.

It appears from the experimental data which has been obtained that regardless of whether an amine or an isocyanate is employed in this reaction, the end product is substantially the same. The end products have substantially the same physical properties and the evidence obtained points to their being the same chemically.

A unique feature of this invention is that reaction products which are soluble in varnish oils and the usual varnish solvents are obtainable from Congo copal resins without incurring the high material losses which are always incurred in the normally employed "running" processes. Thus, yields of 93–95% are the rule in operating in accordance with the subject invention whereas in the running of Congo copals a yield of resin of 80% is generally considered to be exceptional, the actual yields varying from 70 to 80% depending upon the conditions employed.

Having now indicated in a general way the nature and purpose of the invention, there follows a more detailed description of specific embodiments of the invention.

EXAMPLE I

This example illustrates the reaction of Congo copal resin and dehydroabietylamine. The following raw material formulation was employed:

| | Parts |
|---|---|
| Congo copal resin | 700 |
| Dehydroabietylamine | 360 |

The Congo copal resin employed was a good grade consisting of pale yellow to colorless lumps and essentially free of inert materials such as sand, stones and wood. The Congo copal resin was gradually heated to 225° C. At this point, addition of the amine was started and gradual addition thereof was continued over a period of one hour while 300° C. was gained. Heating was continued for 6 hours at 300° C. The resin was then poured and permitted to cool to room temperature. The resin so obtained had a melting point by the Hercules drop method of 132° C. and an acid value of 13.4. The yield of resin was 95% based on the total weight of the ingredients. The resin was found to be truly compatible with nitrocellulose at all ratios of resin to nitrocellulose. Nitrocellulose lacquers containing the resin provided films which evidenced no seediness, graininess or haziness whatsoever. The resin was soluble in drying oils such as linseed oil, tung oil, etc.; aliphatic hydrocarbons such as mineral spirits, gasoline, naphtha, turpentine, etc.; aromatic hydrocarbons such as benzene, xylene, solvent naphtha, etc.; butyl acetate, methyl ethyl ketone, Cellosolve (2-ethoxyethanol), Cellosolve acetate (2-ethoxyethyl acetate), propyl alcohol, butyl alcohol, etc.

The dehydroabietylamine used in preparing this resin was made from wood rosin. The wood rosin was first dehydrogenated by heating the same in the presence of a catalytic amount of palladium at an elevated temperature and pressure in the absence of added substances capable of reducing its ethylenic unsaturation. The dehydrogenated rosin was converted to the corresponding nitrile by reaction with ammonia at an elevated temperature. The nitrile was then reduced with hydrogen at an elevated temperature and pressure in the presence of a catalytic amount of nickel to provide the dehydroabietylamine.

EXAMPLE II

The following example illustrates the reaction of Congo copal resin with dehydroabietyl isocyanate.

| | Parts |
|---|---|
| Congo copal resin | 700 |
| Dehydroabietyl isocyanate | 340 |

The Congo copal resin was gradually heated to 225° C. At this point, the addition of isocyanate was started. A temperature of 300° C. was gained in one hour and maintained for another hour when the addition was complete. Heating was continued for another 4 hours at 300° C. The resin was then poured and permitted to cool to room temperature. The resin so obtained had a melting point by the Hercules drop method of 133° C. and an acid value of 9.7. This resin was truly compatible with nitrocellulose at all ratios of resin to nitrocellulose. Nitrocellulose lacquers containing the resin provided films which evidenced no seediness, graininess or haziness whatsoever. The resin had solubility characteristics similar to those of the resin of Example I. The Congo copal resin employed was the same as that used in Example I.

The dehydroabietyl isocyanate used in this example may be made by treating a xylene solution of the hydrochloride of the dehydroabietylamine of Example I with phosgene at reflux temperature, thereafter distilling off the solvent and then distilling the residue.

EXAMPLE III

The following example illustrates the preparation of a 24 gallon linseed oil oleoresinous varnish. The following raw material formulation was employed:

| | Parts |
|---|---|
| Linseed oil (Z2 viscosity) | 986 |
| Congo copal resin—dehydroabietylamine reaction product of Example I | 514 |

The ingredients were heated to 305° C. in 90 minutes and held for a viscosity of 0 (Gardner-Holdt) at 60% solids in mineral spirits. Forty-five minutes at 305° C. were required to achieve this viscosity. The product was then thinned to 60% solids. In view of the short cooking time, it is apparent that the resin bodied the linseed oil quite rapidly. The resulting varnishes were found to provide films having especially high hot water and alkali resistance. The films were also characterized by high gloss, good depth of finish and good scuff resistance.

EXAMPLE IV

This example illustrates the preparation of lacquers for metal finishes. The following raw material formulations were employed:

A. *Primer-surfacer*

| | Parts |
|---|---|
| Titanium dioxide | 1.0 |
| Asbestine | 12.0 |
| Multiflex | 9.0 |
| Black iron oxide | 10.0 |
| Tricresyl phosphate | 5.0 |
| Nitrocellulose (RS—½ sec.) | 10.8 |
| Ethyl acetate | 18.0 |
| Toluene | 10.0 |
| Butyl acetate | 4.2 |
| 50% solution in toluene of resin of Example I | 20.0 |

The above ingredients were ground in a ball mill for 48 hours and reduced with equal parts of lacquer thinner to spray consistency. The lacquer thinner employed contained 20% butyl acetate, 10% ethyl acetate, 60% toluene, 5% ethyl alcohol and 5% butyl alcohol.

B. *Black top coat lacquer*

| | Parts |
|---|---|
| Carbon black | 21.0 |
| Nitrocellulose (RS—½ sec.) | 12.8 |
| Dioctyl phthalate | 2.5 |
| Air-blown castor oil | 3.8 |
| Toluene | 21.5 |
| Butyl acetate | 9.4 |
| Ethyl acetate | 5.0 |
| Butanol | 6.0 |
| 50% solution in toluene of resin of Example I | 18.0 |

The above ingredients were thoroughly mixed to obtain a good dispersion. The resulting composition was reduced with the above-described lacquer thinner to spray consistency.

Metal panels were finished with the above compositions using one coat of the primer surfacer and two coats of the top coat. When compared with panels finished in a similar manner but with lacquers containing conventional maleated rosin esters, these panels showed substantial improvement in adhesion of the lacquer films to the steel. The panels also evidenced good depth of finish, high gloss and good scuff resistance.

EXAMPLE V

The following example illustrates the preparation of a lacquer for wood finishing.

A lacquer was prepared which contained 22% non-volatile solids, the remainder or volatile portion consisting of solvents and diluents. The non-volatile solids consisted of:

| | Per cent |
|---|---|
| Resin of Example I | 50 |
| Nitrocellulose (RS—½ sec.) | 33 |
| Dioctyl phthalate | 17 |

The volatile portion had substantially the same composition as the lacquer thinner described in Example IV.

Films prepared from the resulting lacquer evidenced complete compatibility between the resin and the nitrocellulose. The above lacquer was compared with a standard lacquer formulated with a conventional hard maleated rosin ester type resin in wood finishing. The above lacquer was found to be outstanding in that it provided a substantial improvement in alcohol and water resistance as compared with the comparator lacquer.

The term "an abietic acid" is employed herein in a generic sense to designate abietic acid, dihydroabietic acid, tetrahydroabietic acid, dehydroabietic acid or mixtures thereof. Similarly, "an abietyl amine" is employed in a generic sense to designate any amine obtainable by converting the —COOH group of any of the aforesaid acids to the —CH$_2$NH$_2$ group. Also, an "abietyl isocyanate" is employed in a generic sense to designate any isocyanate, obtainable by converting the amino group of any of the aforesaid amines to the isocyanate group. On the other hand, the terms "abietic acid," "abietylamine" and "abietyl isocyanate" as used herein refer to the specific compounds indicated or their equivalents as hereinafter set forth.

The above terminology is used in this specification primarily for ease of expression. Although substantially pure abietic acid may be used for the preparation of the intermediates to be used in accordance with this invention, it is more desirable from an economic standpoint to employ abietic acid-containing materials such as the various grades of wood or gum rosin available commercially. Thus, it will be understood that for present purposes wood or gum rosin is to be considered as abietic acid, as is wood or gum rosin which has been treated in some manner, as by distillation, to remove neutral bodies. It will further be understood that any of the natural resin acids other than abietic acid which occur in wood or gum rosin, such acids being l-pimaric acid, d-pimaric acid, sapinic acid, etc., may be used equivalently for abietic acid.

What has been said in the above paragraph applies equally well with respect to the relationship between dehydroabietic acid and dehydrogenated rosins. For present purposes, a dehydrogenated rosin is to be considered as dehydroabietic acid. Similarly, a hydrogenated rosin is to be considered as hydroabietic acid, etc.

As indicated above, hydrogenated abietic acid (either dihydroabietic acid, tetrahydroabietic acid or mixtures thereof) may be used in preparing a hydroabietyl amine for use as an intermediate in accordance with this invention. Suitable procedures for hydrogenating the ethylenic double bonds of abietic acid or its derivatives are known to the art as, for example, those disclosed in U. S. 2,094,117 and U. S. 2,115,036. It will be recognized that an alternative procedure for preparing a hydroabietyl amine would be to first prepare abietylamine from abietic acid and then hydrogenate the amine to effect the desired degree of hydrogenation of the ethylenic bonds.

Dehydrogenated abietic acid has been indicated to be useful in preparing dehydroabietylamine which is useful as an intermediate in accordance with this invention. Suitable procedures for dehydrogenating abietic acid or its derivatives are known to the art. Thus, it is possible to effect substantial dehydrogenation of such compounds by treating the same with an active hydrogenation catalyst under conditions of reaction adopted to produce an intra- and inter-molecular rearrangement of the hydrogen atoms in the resin acid nuclei of the compounds and in the absence of added substances capable of reducing the ethylenic unsaturation of the compounds under the conditions of treatment. See U. S. 2,154,629 in this connection. This treatment is sometimes referred to as disproportionation. Certain types of heat treatment also effect dehydrogenation of abietic acid and its derivatives.

As previously pointed out, any abietyl amine may be used as an intermediate in the preparation of the products of this invention. An abietyl amine may be prepared from an abietic acid by reacting ammonia with the abietic acid to convert the carboxyl group of the abietic acid to the nitrile group and then hydrogenating the resulting nitrile compound to form the amine. The preparation of the nitrile may be carried out by passing gaseous ammonia into the molten abietic acid and vaporizing the water as it formed in order to remove the water from the reaction mixture. Dehydration catalysts may be used to facilitate the reaction with ammonia if desired. The nitrile is preferably purified by neutralization or distillation to make it suitable for hydrogenation to the amine as the presence of acidic materials frequently destroys the hydrogenation catalysts.

The nitriles derived from an abietic acid are readily hydrogenated to amines. The hydrogenation is usually carried out by heating the nitrile at about 150° C. to about 200° C. in the presence of a Raney nickel catalyst under hydrogen pressure up to about 8000 p. s. i. Other catalysts may be employed such as Raney cobalt catalyst, supported nickel or cobalt catalysts, noble metal catalysts such as platinum, palladium, palladium on carbon, or reduced platinum oxide. The hydrogenation may also be carried out in the presence or absence of ammonia. Although the hydrogenation is ordinarily carried out only to the extent of hydrogenation of the nitrile group which hydrogenated quite readily, the hydrogenation may also be carried out under such conditions of temperature, pressure and time of hydrogenation as to hydrogenate any ethylenic bonds which may be present in the nucleus of the nitrile subjected to hydrogenation.

As previously pointed out, instead of an abietyl amine, an abietyl isocyanate may be employed as an intermediate in preparing the resinous compositions of this invention. An abietyl isocyanate may be prepared from an abietyl amine by reaction thereof with phosgene. Either the amines per se or their hydrohalide salts may be employed for this reaction. The reaction is carried out by passing phosgene into a solution of an amine or its hydrohalide or a solution of the amine or its hydrohalide may be added to a solution of phosgene. The temperature at which the reaction is carried out depends upon which procedure is used as well as on the solvent used. In general, a temperature of about 0° C. to about 200° C. may be used. If the phosgene is passed into a solution of the amine or its hydrohalide, it is preferable that the temperature be maintained at about 50° C. to about 200° C. and more preferably about 50° C. to about 150° C. However, if a solution of the amine is added to a solution of phosgene, it is advisable that the addition be made at low temperature, usually about 0° C. to about 5° C. for the first stage of the reaction and that the reaction then be completed by adding additional phosgene to the reaction mixture at a temperature of about 50° C. to about 200° C. or preferably from about 100° C. to about 160° C. The isocyanate may be separated from the reaction mixture by removal of the solvent and distillation of the residue.

The term "Congo copal resin" is used herein as including not only Congo copal per se but also the so-called Congo-type resins such as Zanzibar copal, Benguela copal, Angola copal, Loango copal, Brazil copal, etc. All these Congo-type resins may be used in accordance with this invention. Similarly, the various grades of Congo copal resin may be employed, as for example the white, ivory, straw, amber or pale grades.

In the preparation of the subject synthetic resins, the untreated Congo copal resin is heated with an abietyl amine or isocyanate at a temperature sufficiently high to promote amide formation. The temperature employed should not, however, be so high as to effect substantial decomposition of the reactants or the desired reaction product. In general, the operable temperature range for this reaction is from about 225° C. to about 325° C. Preferably, a temperature of from about 280° C. to about 310° C. is employed. It will be understood, however, that for the reaction of a specific untreated Congo copal resin and a specific abietyl amine or isocyanate, the operable temperature range may be somewhat at variance with the above-mentioned operable temperature range.

A preferred procedure in accordance with this invention is first to heat the untreated Congo copal resin per se to 200–225° C. At this point, the resin is swollen and acquires a spongy and oily appearance. The amine or isocyanate is then added slowly, preferably with vigorous agitation, and at the same time the temperature is raised gradually to the maximum temperature to be employed in the reaction. Heating is continued at the maximum temperature until a resin having an acid number of 25 or below has resulted. It is desirable from the standpoint of providing resins of lighter color than would otherwise be obtainable to pass an inert gas such as $CO_2$ through the reaction mixture during the reaction period to provide an inert atmosphere.

As has been indicated previously, the reactants are heated for such a period as to provide a resin having an acid value of 25 or less and possesing nitrocellulose compatibility. No resin having an acid value substantially in excess of 25 has been found to possess true compatibility with nitrocellulose. It will be apparent, of course, that the reaction period will vary depending upon the temperature employed, the proportions of the reactants, etc.

It will be appreciated that there must be employed, as a minimum, the smallest amount of the abietyl amine or abietyl isocyanate, which is required to provide a resin having the above-described properties; i. e., an acid value of 25 or less and nitrocellulose compatibility. If desired, an excess of the abietyl amine or abietyl isocyanate may be employed, for example, up to 35% in excess of the minimum. The minimum figure which obtains in any particular case is determined mainly by the acid value of the Congo copal resin employed. It will be appreciated that the determination of the acid value; i. e., direct acid value not saponification value, of a Congo copal resin presents a problem in itself due to the fact that the Congo copals are insoluble in practically all organic solvents. They are, however, soluble after they have been subjected to the "running" process. Hence, acid values of the "run" resins can be determined with ease and used as a guide in the formulation of the resins of this invention. Although from what has been said previously there are bound to be some exceptions, it may be said that in general from about 45% to about 65% by weight of the abietyl amine or isocyanate, based on the total weight of the ingredients, may be employed to provide the resins of the invention, and preferably from about 50% to about 55% of the abietyl amine or isocyanate is employed.

The subject resins are significant in that they are truly compatible with nitrocellulose, although the Congo copal resins from which they are derived are inherently incompatible with nitrocellulose. The resins have rather high drop melting points in the range of the commercially produced maleated glycerine esters of rosin. The resins are soluble or dispersible in varnish oils such as linseed, China wood, dehydrated castor, soybean, etc. oils and are soluble in aliphatic hydrocarbons such as mineral spirits, gasoline, naphtha, turpentine, etc.; aromatic hydrocarbons such as benzene, toluene, xylene, solvent naphtha, etc.; esters such as butyl acetate, Cellosolve acetate (2-ethoxyethyl acetate), etc.; alcohols such as isopropyl, propyl, butyl, etc. alcohol; ketones such as methyl ethyl ketone, etc.

When used in the manufacture of oleoresinous varnishes, the subject resins are advantageous in that they body the oil at a fast rate and thus provide rather short kettling periods. The resulting varnishes are characterized by outstanding alkali and water-resistance. Hence, they find utility in protective coatings designed for interior usage such as floor enamels and varnishes, flat wall paints, gloss wall paints, etc. When used in nitrocellulose lacquers, the subject resins provide exceptional adhesion to steel surfaces and provide finishes having excellent resistance to water and ethyl alcohol.

All parts and percentages in the specification and claims are by weight unless otherwise indicated.

What I claim and desire to protect by Letters Patent is:

1. As a new composition of matter, a product of the reaction of an untreated Congo copal resin and a material selected from the group consisting of abietyl amines and abietyl isocyanates at a temperature which promotes amide formation but which does not effect substantial decomposition of the components of the reaction mixture for a period of time long enough to provide a resin having an acid number of 25 or less, said reaction product possessing nitrocellulose compatibility and solubility in varnish oils.

2. As a new composition of matter, a product of the reaction of an untreated Congo copal resin and an abietyl amine at a temperature which promotes amide formation but which does not effect substantial decomposition of the components of the reaction mixture for a period of time long enough to provide a resin having an acid number of 25 or less, said reaction product possessing nitrocellulose compatibility and solubility in varnish oils.

3. As a new composition of matter, a product of the reaction of an untreated Congo copal resin and an abietyl isocyanate at a temperature which promotes amide formation but which does not effect substantial decomposition of the components of the reaction mixture for a period of time long enough to provide a resin having an acid number of 25 or less, said reaction product possessing nitrocellulose compatibility and solubility in varnish oils.

4. As a new composition of matter, a product of the reaction of an untreated Congo copal resin and abietylamine at a temperature which promotes amide formation but which does not effect substantial decomposition of the components of the reaction mixture for a period of time long enough to provide a resin having an acid number of 25 or less, said reaction product possessing nitrocellulose compatibility and solubility in varnish oils.

5. As a new composition of matter, a product of the reaction of an untreated Congo copal resin and dehydroabietylamine at a temperature which promotes amide formation but which does not effect substantial decomposition of the components of the reaction mixture for a period of time long enough to provide a resin having an acid number of 25 or less, said reaction product possessing nitrocellulose compatibility and solubility in varnish oils.

6. As a new composition of matter, a product of the reaction of an untreated Congo copal resin and dehydroabietyl isocyanate at a temperature which promotes amide formation but which does not effect substantial decomposition of the components of the reaction mixture for a period of time long enough to provide a resin having an acid number of 25 or less, said reaction products possessing nitrocellulose compatibility and solubility in varnish oils.

7. A process for the preparation of a nitrocellulose compatible resinous derivative of a Congo copal resin which comprises heating an untreated Congo copal resin with a material selected from the group consisting of abietyl amines and abietyl isocyanates at a temperature which promotes amide formation but which does not effect substantial decomposition of the components of the reaction mixture and for a period of time long enough to provide a resin having an acid number of 25 or less and possessing nitrocellulose compatibility.

8. A process for the preparation of a nitrocellulose compatible resinous derivative of a Congo copal resin which comprises heating an untreated Congo copal resin with a material selected from the group consisting of abietyl amines and abietyl isocyanates at a temperature of from about 225° C. to about 325° C. and for a period of time long enough to provide a resin having an acid number of 25 or less and possessing nitrocellulose compatibility.

9. A process for the preparation of a nitrocellulose compatible resinous derivative of a Congo copal resin which comprises heating an untreated Congo copal resin with an abietyl amine at a temperature of from about 225° C. to about 325° C. and for a period of time long enough to provide a resin having an acid number of 25 or less and possessing nitrocellulose compatibility.

10. A process for the preparation of a nitrocellulose compatible resinous derivative of a Congo copal resin which comprises heating an untreated Congo copal resin with an abietyl isocyanate at a temperature of from about 225° C. to about 325° C. and for a period of time long enough to provide a resin having an acid number of 25 or less and possessing nitrocellulose compatibility.

11. A process for the preparation of a nitrocellulose compatible resinous derivative of a Congo copal resin which comprises heating an untreated Congo copal resin with abietylamine at a temperature of from about 225° C. to about 325° C. and for a period of time long enough to provide a resin having an acid number of 25 or less and possessing nitrocellulose compatibility.

12. A process for the preparation of a nitrocellulose compatible resinous derivative of a Congo copal resin which comprises heating an untreated Congo copal resin with dehydroabietylamine at a temperature of from about 225° C. to about 325° C. and for a period of time long enough to provide a resin having an acid number of 25 or less and possessing nitrocellulose compatibility.

13. A process for the preparation of a nitrocellulose compatible resinous derivative of a Congo copal resin which comprises heating an untreated Congo copal resin with dehydroabietyl isocyanate at a temperature of from about 225° C. to about 325° C. and for a period of time long enough to provide a resin having an acid number of 25 or less and possessing nitrocellulose compatibility.

ALFRED E. RHEINECK.

REFERENCES CITED

The following references are of record in the file of this patent:

UNITED STATES PATENTS

| Number | Name | Date |
| --- | --- | --- |
| 2,007,333 | Krumbhaar | July 9, 1935 |